US008973761B2

(12) United States Patent
Bansal et al.

(10) Patent No.: US 8,973,761 B2
(45) Date of Patent: Mar. 10, 2015

(54) METHOD AND MOLD FOR MAKING A PLEATED FILTER CARTRIDGE

(75) Inventors: Vishal Bansal, Overland Park, KS (US); Jason Mei, Overland Park, KS (US); Jeff Allen Canfield, Belton, MO (US); Bryan David Yetter, Kearney, MO (US)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 13/273,900

(22) Filed: Oct. 14, 2011

(65) Prior Publication Data

US 2013/0092624 A1    Apr. 18, 2013

(51) Int. Cl.
*B01D 27/06* (2006.01)
*B29C 45/14* (2006.01)
*B01D 46/24* (2006.01)
*B01D 46/52* (2006.01)
*B01D 27/00* (2006.01)

(52) U.S. Cl.
CPC .......... *B01D 46/2411* (2013.01); *B01D 46/521* (2013.01); *Y10S 264/48* (2013.01); *Y10S 55/05* (2013.01)
USPC ..................... 210/493.2; 210/493.1; 210/450; 210/455; 210/232; 264/279; 264/DIG. 48; 55/521; 55/DIG. 5

(58) Field of Classification Search
CPC ............. B01D 46/2411; B01D 46/521; B01D 27/005; B01D 2201/34; B01D 2201/291; B01D 2201/293; B01D 2201/296
USPC .............. 210/493.1, 493.2, 450, 321.86, 455, 210/451, 497.01, 445, 232; 264/500, 264/DIG. 48, 271.1, 275, 279; 55/DIG. 5, 55/521
See application file for complete search history.

(56) References Cited

U.S. PATENT DOCUMENTS

| 4,078,036 | A | * | 3/1978 | Keefer | .......................... 264/261 |
| 4,878,930 | A | | 11/1989 | Manniso et al. | |
| 5,350,515 | A | * | 9/1994 | Stark et al. | .................. 210/493.2 |
| 5,733,452 | A | * | 3/1998 | Whitlock | ................. 210/497.01 |
| 5,891,337 | A | | 4/1999 | Keller | |
| 6,638,332 | B1 | * | 10/2003 | Schmitz et al. | .................. 55/392 |
| 6,911,144 | B2 | * | 6/2005 | Van Pelt et al. | ................ 210/232 |
| 8,486,263 | B2 | * | 7/2013 | Argue et al. | .................. 210/232 |

(Continued)

FOREIGN PATENT DOCUMENTS

| CA | 2320382 A1 | 3/2001 |
| EP | 0172699 A1 | 2/1986 |

(Continued)

OTHER PUBLICATIONS

Machine translation of WO 00/01464.*

(Continued)

*Primary Examiner* — Nam Nguyen
*Assistant Examiner* — Madeline Gonzalez
(74) *Attorney, Agent, or Firm* — Reinhart Boerner Van Deuren P.C.

(57) ABSTRACT

Disclosed in this specification is a method for making a pleated filter cartridge by placing a pleated filter on a mold and adding a polymerizable potting compound to the inner cavity of the pleated filter. The potting compound is permitted to cover the portion of the upper surface of the mold that is encompassed by the pleats. The potting compound is selected to form a polyurethane after polymerization is complete.

14 Claims, 4 Drawing Sheets

(56) References Cited

U.S. PATENT DOCUMENTS

2003/0182911 A1 10/2003 Schrage
2005/0211623 A1* 9/2005 Moscaritolo et al. ......... 210/440

FOREIGN PATENT DOCUMENTS

JP 56046719 A 4/1981
WO 00/01464 A2 1/2000

OTHER PUBLICATIONS

Search Report for corresponding GB Patent Application No. 1217903.2, dated Feb. 6, 2013.

* cited by examiner

METHOD AND MOLD FOR MAKING A PLEATED FILTER CARTRIDGE

BACKGROUND OF THE INVENTION

The subject matter disclosed herein relates to a method and mold for making a pleated filter cartridge and more specifically to a method for making the molded bottom end cap of such a cartridge.

Conventional pleated filter cartridges include a pleated filter disposed between two molded end caps (i.e., a top end cap and bottom end cap). These pleated filters are used in a variety of applications, including removing particulates from gases in the food, pharmaceutical, and energy industries. During use, a gas (e.g. air) is passed over the surface of the pleated filter to trap particulates that may be present (e.g. dust, milk dust, coal dust, pollen, microorganisms including yeast, mold and bacteria). Initially, these particulates are entrapped on the surface of the pleated filter. Over time, the particulates may accumulate on the horizontally extending ledges of the molded bottom end cap. This accumulation can result either from particulate drift due to gravity or from the entrapped particles being dislodged during pulse jet cleaning. In certain applications, particulate accumulation on the horizontally extending ledges of the molded bottom end cap can impact the efficacy of the filtering process by reducing the available filtering area or increasing the risk of contamination or combustion.

It is difficult to produce quality pleated filter cartridges that do not have a horizontally extending ledge on their molded bottom end cap. The prior art method for producing such cartridges use two-part epoxy resins that have certain manufacturing challenges associated with them that inhibit their use on a commercial scale.

There is a need to provide an improved method for rapidly making pleated filter cartridges that do not have a horizontally extending ledge on their molded bottom end cap.

The discussion above is merely provided for general background information and is not intended to be used as an aid in determining the scope of the claimed subject matter.

BRIEF DESCRIPTION OF THE INVENTION

Disclosed in this specification is a method and mold for making a pleated filter cartridge by placing a pleated filter on a mold and adding a polymerizable potting compound to the inner cavity of the pleated filter. The potting compound is permitted to cover the portion of the upper surface of the mold that is encompassed by the pleats. The potting compound is selected to form a polyurethane bottom end cap after polymerization is complete.

An advantage that may be realized in the practice of some disclosed embodiments of the method is that polyurethanes usually cure more rapidly than two-part epoxy resins. This rapid curing minimizes permeation of the polyurethane through the pleated filter and minimizes the amount of polyurethane that leaks around the perimeter of the pleated filter, reducing or eliminating any horizontally extending ledges on the molded bottom end cap. Moreover, the molding process is sufficiently rapid to permit production of the pleated filter cartridges at speeds sufficient for commercial production.

In one exemplary embodiment, a method for making a pleated filter cartridge is disclosed. The method comprises the steps of placing the bottom end of a pleated filter on an elastomeric surface of the mold and applying a downward force to establish a seal. A polymerizable potting compound is added to the inner cavity and permitted to cover the portion of the elastomeric surface of the mold that is encompassed by the pleats including the spaces between the pleats that are part of the inner cavity. The potting compound is permitted to polymerize to form a polyurethane bottom end cap which is then removed from the mold.

In another exemplary embodiment, a mold for forming a bottom end cap of a pleated filter cartridge is disclosed, the mold comprising a base having a top surface with an elastomeric surface.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
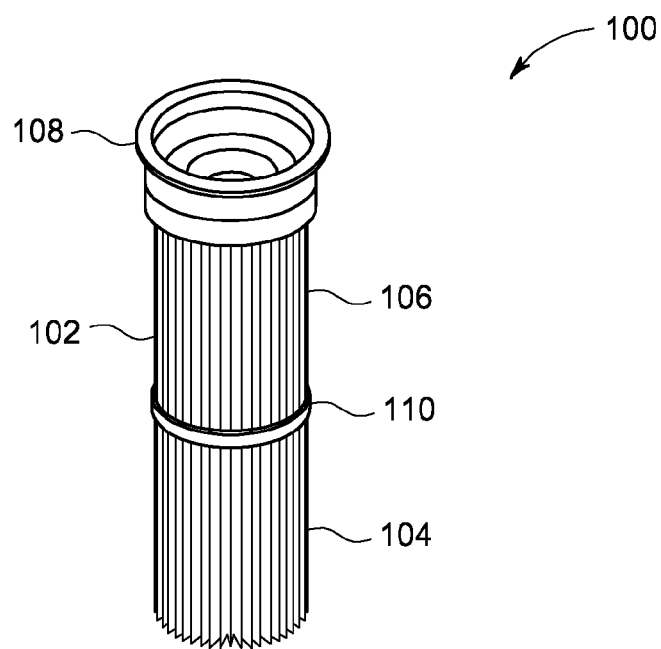
FIG. 1 is a top perspective view of an exemplary pleated filter cartridge.

FIG. 1 is a top perspective view of an exemplary pleated filter cartridge 100. Pleated filter cartridge 100 has an elongated pleated filter 102 which has a bottom end 104 and a top end 106. The top end 106 of the pleated filter 102 has a top end cap 108. An external support strap 110 encompasses the circumference of the pleated filter 102, which can be formed of any suitable material. In one embodiment, the pleated filter 102 is formed of 260 gram per square meter spunbond non-woven material made with bicomponent polyester fibers. Other suitable fiber materials include poly-p-phenylene sulfide (PPS), aramid, polytetrafluoroethylene (PTFE) or glass fibers. Non-woven constructs are also suitable. Examples of non-woven constructs include needle-punched felts, carded thermobonds, or hydroentangled webs. In one embodiment, these constructs are stiffened with resin or thermal heat calendaring. In another embodiment, an expanded PTFE (ePTFE) membrane is laminated into the pleated filter 102. The bottom end 104 of the pleated filter 102 has a bottom end cap that is not visible from the perspective of FIG. 1 but is visible in FIG. 2.

Figure 2:
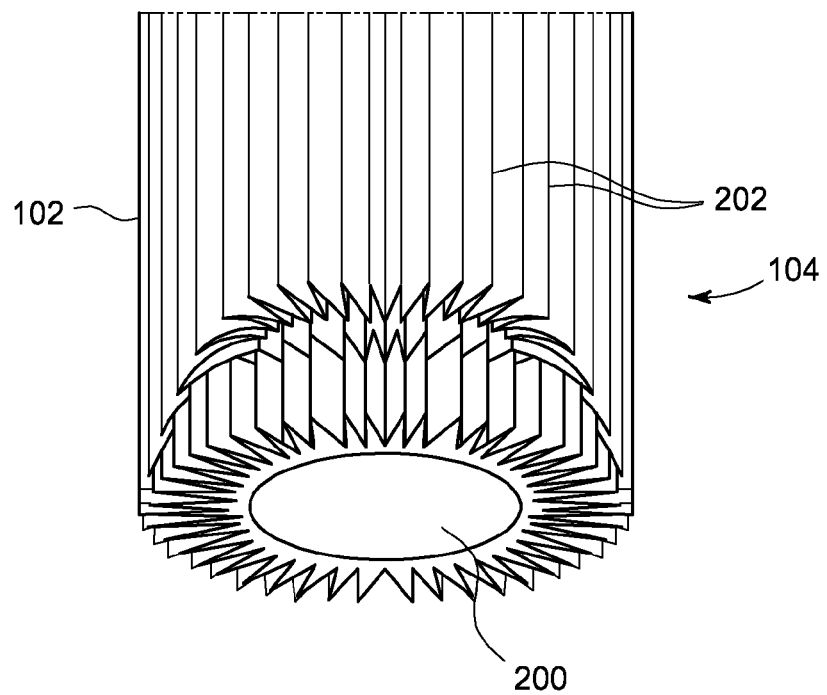
FIG. 2 is bottom perspective view of the exemplary pleated filter cartridge of FIG. 1 with a portion of the pleated filter cut away to illustrate the molded bottom end cap.

FIG. 2 shows a bottom perspective view of the exemplary pleated filter cartridge 100 of FIG. 1 with a portion of the pleated filter 102 cut away to illustrate the molded bottom end cap 200. The molded bottom end cap 200 is formed from a polyurethane, which is present between the pleats 202 of pleated filter 102 within the confines of pleated filter 102. The polyurethane molded bottom end cap 200 does not extend outside of the perimeter of the pleated filter 102.

Figure 3:
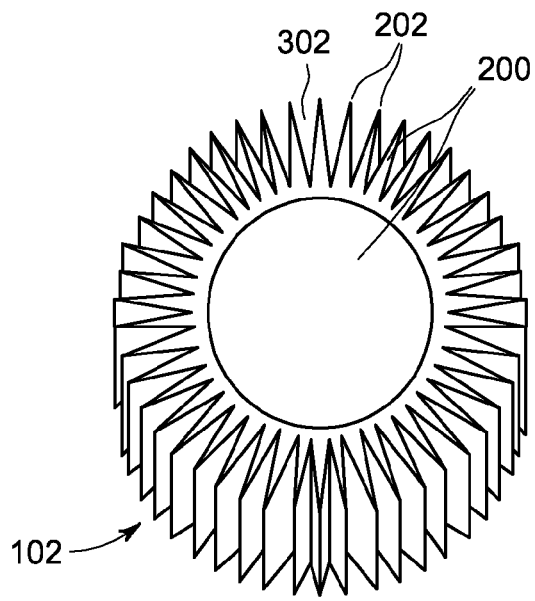
FIG. 3 is a bottom perspective view of a section of the molded bottom end cap.

FIG. 3 is a bottom perspective view of a section of the molded bottom end cap 200, illustrating pleated filter 102 circumscribed by pleats 202. The jagged circumference of pleats 202 defines the perimeter of the inner cavity 610 (see FIG. 6) of the pleated filter 102. The polyurethane bottom end cap 200 covers the inner cavity 610 of the pleated filter 102, including those portions of the inner cavity 610 between the pleats 202. The spaces 302 between the pleats 202, which are not part of the inner cavity 610, are free of polyurethane.

Figure 4:
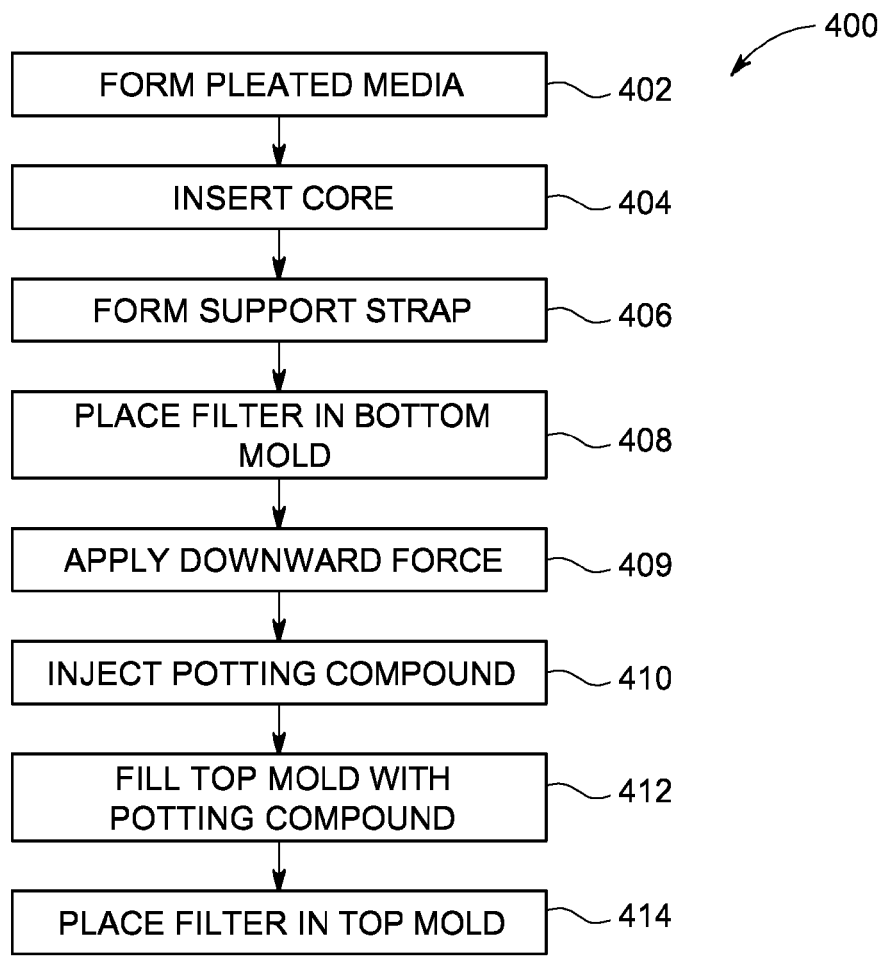
FIG. 4 is a flow diagram for an exemplary method for making a pleated filter cartridge.

FIG. 4 is a flow diagram for an exemplary method 400 for making a pleated filter cartridge 100. In step 402, filter media is cut to a predetermined size, folded to form pleats, encircled to form a cylinder, and seam sealed to create a pleated filter 102. In step 404, an internal support core 604 (see FIG. 6) is inserted into inner cavity 610 of pleated filter 102 to provide structural integrity to the pleated filter 102. A variety of support cores may be used provided they do not block the potting compound 600 used to form the molded bottom end cap 200 from flowing between the pleats 202. In one embodiment, the support core 604 is a wire frame and the potting compound 600 passes between the frame. In another embodiment, the support core 604 is a cylindrical tube with passages for passing the potting compound 600 between pleats 202.

Figure 5:
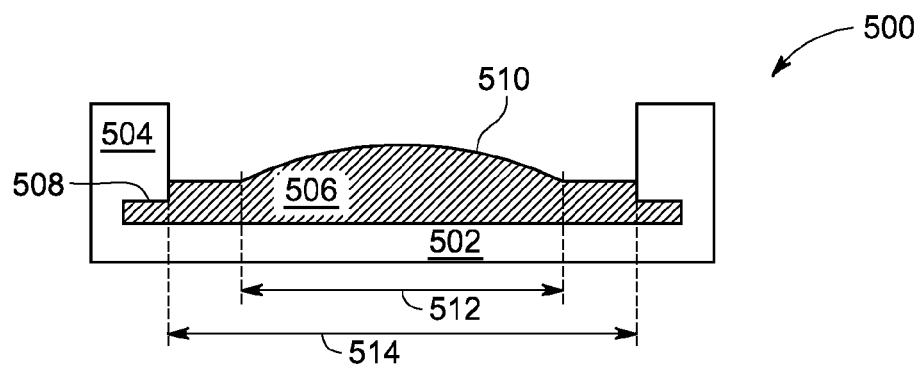
FIG. 5 is a cross-section of an exemplary mold for making a bottom end cap.

In step 406, external support strap 110 is formed. In one embodiment, the external support strap 110 is formed by extrusion. The external support strap 110 circumscribes the outer diameter of the pleated filter 102 and holds the pleated filter 102 against the support core 604. In step 408, the bottom end 104 of the pleated filter 102 is inserted into a mold 500. FIG. 5 is a cross-section of an exemplary mold 500 for making a bottom end cap 200. The mold 500 has a circular base 502 and a vertical sidewall 504 that may be formed from any suitable material (e.g., aluminum). The mold 500 also includes a circular elastomeric surface 506.

In step 409, after the pleated filter 102 has been inserted into the mold 500, a downward force 606 is applied to the top end 106 of the pleated filter 102 that causes the bottom end 104 of the pleated filter 102 to impinge into the elastomeric surface 506, which has a minimal Shore hardness. In one embodiment, the Shore A hardness is between 0 and 20. In another embodiment, the Shore 00 hardness is between 10 and 60. In one embodiment, the applied downward force 606 is of sufficient magnitude to cause the elastomeric surface 506 to be deformed to form a liquid-tight seal. In one embodiment, the downward force can be applied manually, while in another embodiment, the downward force can be applied by a plate powered by hydraulics.

In step 410, a polymerizable potting compound 600 is added to inner cavity 610. The components of the potting compound 600 are selected such that, after polymerization, a polyurethane is formed. In one embodiment, the potting compound 600 includes an isocyanate monomer and a hydroxyl monomer. In one such embodiment, a soft polyurethane is formed by selecting a flexible, difunctional hydroxyl monomer such as polyethylene glycol (PEG). The polyurethane may be a thermoplastic or thermoset polyurethane. Examples of suitable thermoset polyurethanes include material 1384A available from MCPU Polymer Engineering LLC (Pittsburg, Kans.). Examples of suitable thermoplastic polyurethanes include the Pellethane brand polymers from Lubrizol (Wickliffe, Ohio). In one embodiment, the Shore A hardness of the cured polyurethane molded bottom end cap is between 20 and 80. In another embodiment, the Shore A hardness is greater than 80. In certain embodiments, the potting compound 600 includes a cross-linking agent.

The liquid-tight seal formed between the bottom end 104 of the pleated filter 102 and the elastomeric surface 506 at step 409 prevents the potting compound 600 from leaking outside of the inner cavity 610 of the pleated filter 102. In certain embodiments, the composition of the elastomeric surface 506 is selected to function as a release agent to facilitate removal of the pleated filter cartridge 100 and molded bottom end cap 200 after the polyurethane has cured in step 410. A spraying agent can also be used to facilitate removal of the pleated filter cartridge 100 after curing. Examples of suitable elastomers for the elastomeric surface 506 include silicone elastomers. In the embodiment depicted in FIG. 5, the elastomeric surface 506 is held in place by a ledge 508 inserted into a groove in the vertical sidewall 504. The elastomeric surface 506 of the mold 500 includes a bump 510 that has a bump width 512. In one embodiment, the bump width 512 is at least 50% of the magnitude of the mold inner diameter 514. In another embodiment, the bump width 512 is at least 75% of the magnitude of the mold inner diameter 514. In yet another embodiment, the bump width 512 is at least 85% the magnitude of the mold inner diameter 514. The bump 510 serves several functions, one of which is to guide the polymerizable potting compound 600 toward the pleats 202 in step 410. In one embodiment, the bump 510 is circular and has a height that is at a maximum at the center of the bump 510 and gradually diminishes in height as the distance from its center increases (i.e. near the edges of the bump 510). The bump 510 may be centered with respect to the support core 604 during step 410. This shape facilitates the flow of the potting compound 600 to the areas between the pleats 202 during step 410. Additionally, the presence of the bump 510 diminishes the amount of potting compound 600 needed to create the molded bottom end cap 200, which speeds the curing process.

Figure 6:
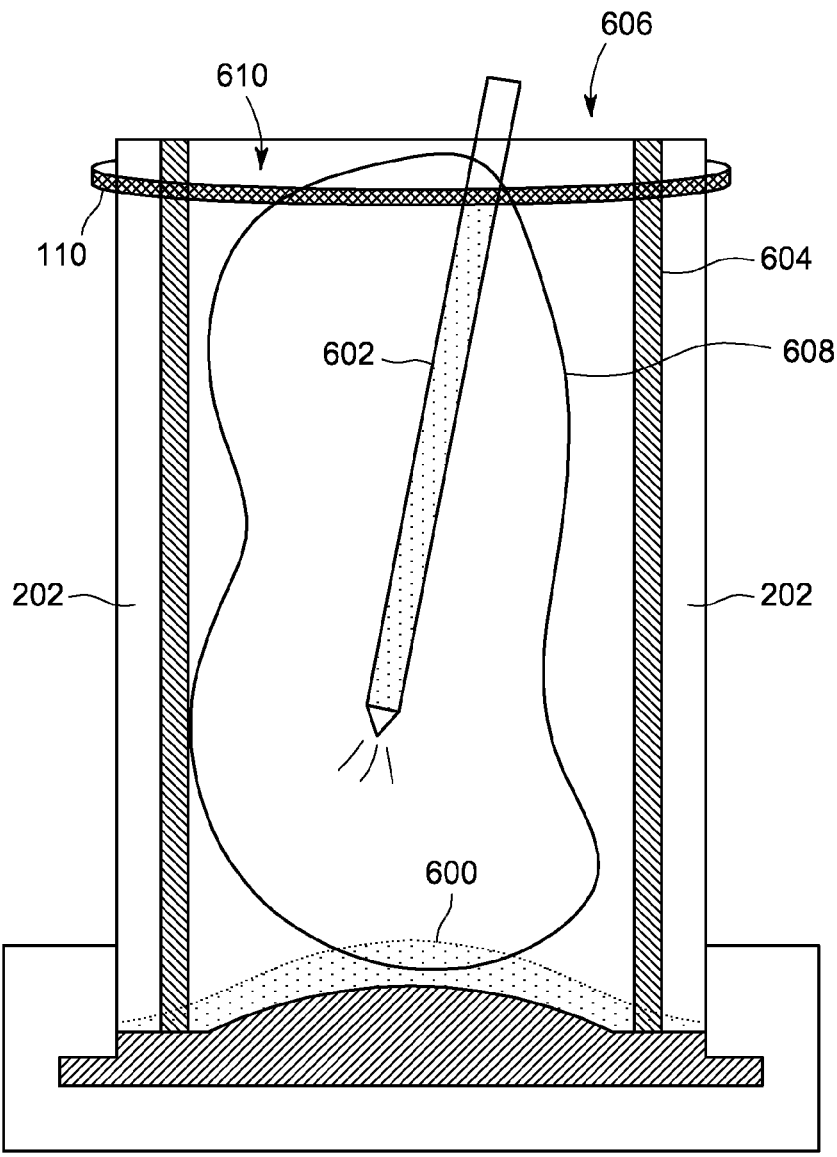
FIG. 6 is a depiction of the exemplary mold of FIG. 5 in use.

In FIG. 6, which is a is a depiction of the exemplary mold 500 of FIG. 5 in use, a window 608 is shown in the pleated filter 102 to aid in the illustration of the inner cavity 610 of the pleated filter 102. The potting compound 600 is injected into the inner cavity 610 of the pleated filter using nozzle 602 and thereafter permitted to cover the portion of the elastomeric surface 506 that is circumscribed by pleats 202. A sufficient volume of the potting compound 600 is used to fill the inner cavity 610 of the pleated filter 102 to a pre-determined depth. For example in one embodiment, the potting compound 600 fills a depth of about 0.5 cm to about 10 cm and all sub-ranges therebetween.

The potting compound 600 is permitted to polymerize to form a polyurethane bottom end cap 200. Advantageously, polyurethanes polymerize rapidly compared to other conventional polymers (e.g. two-part epoxy resins which typically require several hours to cure). Accordingly, many processing problems are obviated by using polyurethanes. For example, diffusion of the potting compound 600 through the pleated filter 102, as well as wetting of the pleated filter 102 through wicking action, is minimized due to the rapid polymerization of polyurethanes. The rapid polymerization of polyurethanes also minimizes leakage of the resin outside of the portion circumscribed by the pleats 202. In one embodiment, the resulting polyurethane has a Shore A hardness between 20 and 80. Polyurethanes with a Shore A hardness outside of the range of 20 to 80 may also be used. Once the polyurethane has finished curing, the pleated filter 102 is removed from the mold 500.

Figure 7:
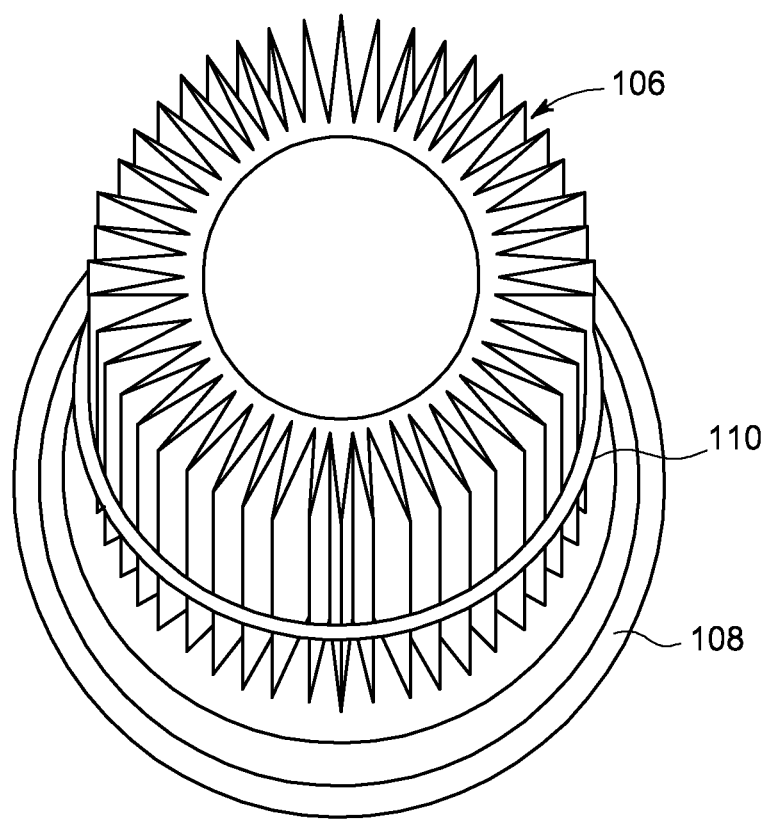
FIG. 7 is a perspective view of an exemplary molded top end cap of the pleated filter cartridge of FIG. 1.

In step 412, a second mold (not shown) is filled with a polymerizable resin. In one embodiment, this polymerizable resin is a potting compound 600. In another embodiment, the polymerizable resin has a composition that is different than the composition of potting compound 600. During step 414, the top end 106 of the pleated filter 102 is inserted into this second mold and is removed after a specified cure time. In this fashion, top end cap 108 is formed. FIG. 7 is a perspective view of an exemplary molded top end cap 108 of the pleated filter cartridge 100 of FIG. 1. The shape and configuration of the molded top end cap 108 varies according to the design of a specific cartridge.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for making a pleated filter cartridge using a mold that has an elastomeric surface for forming a seal with a bottom end of a pleated filter, the method comprising the steps of:

placing the bottom end of the pleated filter on an elastomeric surface of the mold, the pleated filter having pleats that define an inner cavity and a perimeter, the elastomeric surface comprising a circular bump protruding from the elastomeric surface, the circular bump being disposed within the inner cavity and having a height that is at a maximum at the center of the circumference of the circular bump and diminishes in height from the center of the circumference to the perimeter of the circumference, the center of the circumference intersecting a central longitudinal axis of the pleated filter;

applying a downward force to the top end of the pleated filter to cause the pleated filter to establish a seal with the elastomeric surface of the mold;

adding a polymerizable potting compound to the inner cavity and permitting the potting compound to cover the portion of the elastomeric surface of the mold that is encompassed by the pleats including the spaces between the pleats that are part of the inner cavity, the circular bump being shaped to guide the potting compound toward the pleats, the potting compound being selected to form a polyurethane after polymerization, wherein the polymerizable potting compound does not extend outside the perimeter of the pleated filter;

permitting the potting compound to polymerize to form a polyurethane bottom end cap; and removing the polyurethane bottom end cap from the mold.

2. The method as recited in claim 1, further comprising the step of forming an external support strap encompassing the circumference of the pleated filter.

3. The method as recited in claim 2, wherein the external support strap is formed by extrusion.

4. The method as recited in claim 1, wherein the step of adding a polymerizable potting compound adds an amount of potting compound to fill the inner cavity to a depth of about 0.5 cm to about 10 cm.

5. The method as recited in claim 1, wherein the potting compound comprises an isocyanate monomer and a hydroxyl monomer.

6. The method as recited in claim 1, wherein the elastomeric surface comprises a silicone elastomer.

7. The method as recited in claim 1, wherein the elastomeric surface has a Shore A hardness of between 0 and 20.

8. The method as recited in claim 1, wherein the step of applying a downward force to the top end of the pleated filter causes the elastomeric surface to be deformed by the pleats of the bottom end of the pleated filter to establish the seal.

9. The method as recited in claim 1, further comprising the steps of:

adding a polymerizable resin to a second mold;

placing a top end of the pleated filter in the polymerizable resin;

permitting the polymerizable resin to cure to form a top end cap; and removing the top end cap from the second mold.

10. The method as recited in claim 9, wherein the polymerizable resin is selected to form a polyurethane after polymerization.

11. The method as recited in claim 1, further comprising the step of inserting a support core into the pleated filter.

12. The method as recited in claim 1, wherein the potting compound is selected to form a thermoplastic polyurethane after polymerization.

13. The method as recited in claim 1, wherein the bump has a diameter that is at least 50% of a diameter of the inner cavity.

14. The method as recited in claim 1, wherein the maximum of the height of the circular bump is at the center of the circumference and all other points on the circular bump are below the maximum.

\* \* \* \* \*